United States Patent
Liu et al.

(10) Patent No.: US 12,206,622 B2
(45) Date of Patent: Jan. 21, 2025

(54) APPARATUS AND METHOD OF HARQ-ACK FEEDBACK

(71) Applicant: Lenovo (Beijing) Limited, Beijing (CN)

(72) Inventors: Bingchao Liu, Changping District (CN); Chenxi Zhu, Haidian District (CN); Haipeng Lei, Haidian District (CN); Wei Ling, Changping (CN)

(73) Assignee: Lenovo (Beijing) Limited, Beijing (CN)

( * ) Notice: Subject to any disclaimer, the term of this patent is extended or adjusted under 35 U.S.C. 154(b) by 370 days.

(21) Appl. No.: 17/631,618

(22) PCT Filed: Aug. 1, 2019

(86) PCT No.: PCT/CN2019/098912
§ 371 (c)(1),
(2) Date: Jan. 31, 2022

(87) PCT Pub. No.: WO2021/016997
PCT Pub. Date: Feb. 4, 2021

(65) Prior Publication Data
US 2022/0294591 A1  Sep. 15, 2022

(51) Int. Cl.
*H04L 5/00* (2006.01)
*H04L 1/1829* (2023.01)
*H04W 72/044* (2023.01)

(52) U.S. Cl.
CPC .......... *H04L 5/0055* (2013.01); *H04L 1/1861* (2013.01); *H04W 72/044* (2013.01)

(58) Field of Classification Search
CPC ... H04L 5/0055; H04L 1/1861; H04W 72/044
See application file for complete search history.

(56) References Cited

U.S. PATENT DOCUMENTS

| | | | | |
|---|---|---|---|---|
| 2010/0027456 | A1* | 2/2010 | Onggosanusi | H04B 7/024 370/312 |
| 2018/0310257 | A1* | 10/2018 | Papasakellariou | H04W 72/23 |

(Continued)

FOREIGN PATENT DOCUMENTS

| WO | 2019139405 | | 7/2019 |
|---|---|---|---|
| WO | 2021016997 | | 2/2021 |
| WO | 2021016997 | A1 | 2/2021 |

OTHER PUBLICATIONS

"International Preliminary Report on Patentability", PCT Application No. PCT/CN2019/098912, Feb. 10, 2022, 5 pages.

(Continued)

*Primary Examiner* — Jael M Ulysse
(74) *Attorney, Agent, or Firm* — FIG. 1 Patents

(57) ABSTRACT

Apparatus and methods of Hybrid Automatic Repeat Request (HARQ) Acknowledgement (ACK) feedback for multiple Physical Downlink Control Channel (PDCCH) based multiple Transmit Receive Points (TRP) transmission are disclosed. The apparatus includes: a receiver that receives a plurality of configurations of control resource sets (CORESETs), wherein each CORESET comprises a plurality of resource blocks (RBs) in frequency domain and a plurality of symbols in time domain, and time-frequency resources identified by the CORESET are used to transmit a Downlink Control Information (DCI); a processor that determines a Hybrid Automatic Repeat Request (HARQ) Acknowledgement (ACK) feedback selected from a group consisting of: a separate HARQ-ACK feedback and a joint HARQ-ACK feedback; and
a transmitter that transmits the determined HARQ-ACK feedback; wherein the separate HARQ-ACK feedback is (Continued)

transmitted through a plurality of uplink resources; and the joint HARQ-ACK feedback is transmitted through one uplink resource.

20 Claims, 8 Drawing Sheets

(56) References Cited

U.S. PATENT DOCUMENTS

| | | | | |
|---|---|---|---|---|
| 2018/0324787 | A1* | 11/2018 | Yin | H04L 5/0053 |
| 2019/0053219 | A1* | 2/2019 | Tiirola | H04L 5/0053 |
| 2020/0107353 | A1* | 4/2020 | Jung | H04W 72/23 |
| 2020/0128573 | A1* | 4/2020 | Park | H04L 1/1854 |
| 2020/0274660 | A1* | 8/2020 | Xiong | H04L 5/0057 |
| 2020/0305168 | A1* | 9/2020 | Liou | H04W 76/11 |
| 2020/0328849 | A1* | 10/2020 | Noh | H04L 1/1812 |
| 2021/0022167 | A1* | 1/2021 | Khoshnevisan | H04W 72/23 |
| 2021/0344448 | A1* | 11/2021 | Nogami | H04L 1/1614 |
| 2022/0103330 | A1* | 3/2022 | Li | H04L 1/1671 |
| 2022/0140954 | A1* | 5/2022 | Kim | H04L 1/1861 370/329 |
| 2022/0248398 | A1* | 8/2022 | Jung | H04W 72/1268 |
| 2022/0256573 | A1* | 8/2022 | Frenne | H04L 1/1812 |
| 2022/0264562 | A1* | 8/2022 | Choi | H04L 1/1896 |
| 2023/0124262 | A1* | 4/2023 | Kim | H04L 1/1812 370/329 |
| 2023/0128932 | A1* | 4/2023 | Kim | H04L 1/1861 370/336 |

OTHER PUBLICATIONS

"International Search Report and Written Opinion", PCT Application No. PCT/CN2019/098912, Apr. 22, 2020, 6 pages.

CATT, "On multi-TRP/panel transmission", 3GPP TSG RAN WG1 Meeting #97, R1-1906345, Reno, Nevada, USA [retrieved Apr. 14, 2022]. Retrieved from the Internet <https://www.3gpp.org/ftp/tsg_ran/WG1_RL1/TSGR1_97/Docs>., May 17, 2019, 17 pages.

NTT DOCOMO, Inc, "Enhancements on multi-TRP/panel transmission", 3GPP TSG RAN WG1 #97, R1-1906224, Reno, Nevada, USA [retrieved Apr. 14, 2022]. Retrieved from the Internet <https://www.3gpp.org/ftp/tsg_ran/WG1_RL1/TSGR1_97/Docs>., May 17, 2019, 32 pages.

Panasonic, "On multi-TRP enhancements for NR MIMO in Rel. 16", 3GPP TSG RAN WG1 #97, R1-1907031, Reno, Nevada, USA [retrieved Apr. 13, 2022]. Retrieved from the Internet <https://www.3gpp.org/ftp/TSG_RAN/WG1_RL1/TSGR1_97/Docs/>., May 17, 2019, 16 pages.

Qualcomm Incorporated, "Multi-TRP Enhancements", 3GPP TSG-RAN WG1 Meeting #97, R1-1907289, Reno, Nevada, USA [retrieved Apr. 14, 2022]. Retrieved from the Internet <https://www.3gpp.org/ftp/tsg_ran/WG1_RL1/TSGR1_97/Docs>., May 17, 2019, 25 pages.

19939069.1, "Extended European Search Report", EP Application No. 19939069.1, Mar. 31, 2023, 9 pages.

Samsung, "Enhancements on MIMO for NR", 3GPP TSG RAN meeting #84, RP-191187, Newport Beach, USA [retrieved Apr. 13, 2023]. Retrieved from the Internet <https://www.3gpp.org/ftp/TSG_RAN/TSG_RAN/TSGR_84/Docs/?sortby=daterev>, Jun. 2019, 17 pages.

\* cited by examiner

APPARATUS AND METHOD OF HARQ-ACK FEEDBACK

FIELD

The subject matter disclosed herein relates generally to wireless communication and more particularly relates to, but not limited to, an apparatus and methods of Hybrid Automatic Repeat Request (HARQ) Acknowledgement (ACK) feedback for multiple Physical Downlink Control Channel (PDCCH) based multiple Transmit Receive Points (TRP) transmission.

BACKGROUND

The following abbreviations and acronyms are herewith defined, at least some of which are referred to within the following description.

Third Generation Partnership Project (3GPP), 5th Generation (5G), New Radio (NR), 5G Node B (gNB), Long Term Evolution (LTE), LTE Advanced (LTE-A), Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Hybrid Automatic Repeat Request (HARQ), Acknowledgement (ACK), Hybrid Automatic Repeat Request Acknowledgement (HARQ-ACK), Radio Access Technology (RAT), Negative Acknowledgement (NACK/NAK), Physical Downlink Control Channel (PDCCH), Physical Downlink Shared Channel (PDSCH), Physical Uplink Control Channel (PUCCH), Physical Uplink Shared Channel (PUSCH), Code Block Group (CBG), Control Resource Set (CORESET), Downlink Assignment Index (DAI), Downlink Control Information (DCI), enhanced Mobile Broadband (eMBB), Identification (ID), Multiple Input Multiple Output (MIMO), Radio Resource Control (RRC), Transport Block (TB), Time-Division Multiplexing (TDM), Transmit Receive Points (TRP), Uplink Control Information (UCI), Ultra Reliable Low Latency Communications (URLLC), Component Carrier (CC). As used herein, "HARQ-ACK" may represent collectively the Positive Acknowledge (ACK) and the Negative Acknowledge (NAK). ACK means that a TB is correctly received while NAK means a TB is erroneously received.

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied for NR Release 16. A TRP is an apparatus to transmit and receive signals which is controlled by a gNB through the backhaul between the gNB and the TRP.

In 3GPP 5G NR, the downlink (DL) transport blocks (TBs) are carried on the Physical Downlink Shared Channel (PDSCH) from a gNB/TRP to a UE. In one example, a maximum of two TBs can be transmitted on PDSCH in one serving cell and in one slot. HARQ (Hybrid Automatic Repeat Request Acknowledgement) represents the Positive Acknowledgement (ACK) and the Negative Acknowledgement (NACK) collectively. ACK or A means that a TB is correctly received by the UE while NACK or N means a TB is erroneously received by the UE.

In NR, besides the TB-based retransmission, CBG (code block group)-based retransmission is also supported. The intention of the CBG is to group several code blocks into one code block group and, as a result, the HARQ codebook is generated per CBG. Only if all the code blocks within one CBG are correctly decoded, the HARQ-ACK information bit for the CBG can be set to ACK; otherwise, it is set to NACK.

SUMMARY

According to a first aspect, there is provided an apparatus comprising: a receiver that receives a plurality of configurations of control resource sets (CORESETs), wherein each CORESET comprises a plurality of resource blocks (RBs) in frequency domain and a plurality of symbols in time domain, and time-frequency resources identified by the CORESET are used to transmit a Downlink Control Information (DCI); a processor that determines a Hybrid Automatic Repeat Request (HARQ) Acknowledgement (ACK) feedback selected from a group consisting of: a separate HARQ-ACK feedback and a joint HARQ-ACK feedback; and a transmitter that transmits the determined HARQ-ACK feedback; wherein the separate HARQ-ACK feedback is transmitted through a plurality of uplink resources; and the joint HARQ-ACK feedback is transmitted through one uplink resource.

According to a second aspect, there is provided an apparatus comprising: a transmitter that includes transmitting components of a plurality of transmit and receive points (TRPs), wherein the transmitter transmits a plurality of configurations of control resource sets (CORESETs), each CORESET comprises a plurality of resource blocks (RBs) in frequency domain and a plurality of symbols in time domain, and time-frequency resources identified by the CORESET are used to transmit a Downlink Control Information (DCI); a receiver that includes receiving components of the TRPs, wherein the receiver receives a Hybrid Automatic Repeat Request (HARQ) Acknowledgement (ACK) feedback; and a processor that determines a category of the HARQ-ACK feedback as one selected from a group consisting of: a separate HARQ-ACK feedback and a joint HARQ-ACK feedback; wherein the separate HARQ-ACK feedback is transmitted through a plurality of uplink resources; and the joint HARQ-ACK feedback is transmitted through one uplink resource.

According to a third aspect, there is provided a method comprising: receiving, by a receiver, a plurality of configurations of control resource sets (CORESETs), wherein each CORESET comprises a plurality of resource blocks (RBs) in frequency domain and a plurality of symbols in time domain, and time-frequency resources identified by the CORESET are used to transmit a Downlink Control Information (DCI); determining, by a processor, a Hybrid Automatic Repeat Request (HARQ) Acknowledgement (ACK) feedback selected from a group consisting of: a separate HARQ-ACK feedback and a joint HARQ-ACK feedback; and transmitting, by a transmitter, the determined HARQ-ACK feedback; wherein the separate HARQ-ACK feedback is transmitted through a plurality of uplink resources; and the joint HARQ-ACK feedback is transmitted through one uplink resource.

According to a fourth aspect, there is provided a method comprising: transmitting, by a transmitter that includes transmitting components of a plurality of transmit and receive points (TRPs), a plurality of configurations of control resource sets (CORESETs), each CORESET comprises a plurality of resource blocks (RBs) in frequency domain and a plurality of symbols in time domain, and time-frequency resources identified by the CORESET are used to transmit a Downlink Control Information (DCI); receiving, by a receiver that includes receiving components of the TRPs, a Hybrid Automatic Repeat Request (HARQ) Acknowledgement (ACK) feedback; and determining, by a processor, a category of the HARQ-ACK feedback as one selected from a group consisting of: a separate HARQ-ACK feedback and a joint HARQ-ACK feedback; wherein the separate HARQ-ACK feedback is transmitted through a plurality of uplink resources; and the joint HARQ-ACK feedback is transmitted through one uplink resource.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
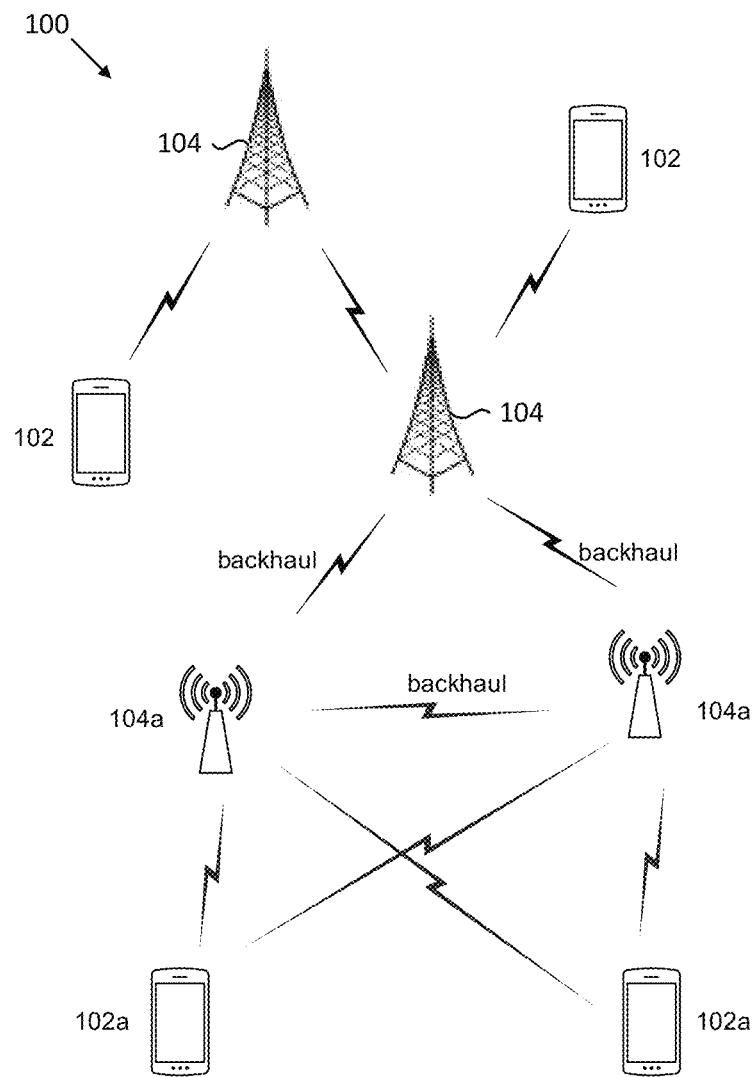
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100 with multiple TRPs 104a. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Direct or indirect communication link between two or more NEs 104 may be provided.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more transmit receive points (TRPs) that utilize a non-ideal backhaul, simultaneously. A TRP may be a transmission point of a gNB. Multiple beams may be used by the UE and/or TRP(s). The two or more TRPs may be TRPs of different gNBs, or a same gNB. A PUCCH resource group composed of multiple PUCCH resources may be associated with each TRP. Each TRP may be associated with a group of control-resource set (CORESET). A CORESET is a set of time-frequency resources and the CORESET is used to transmit DCI. Therefore, each TRP may be associated with a CORESET group.

Figure 2:
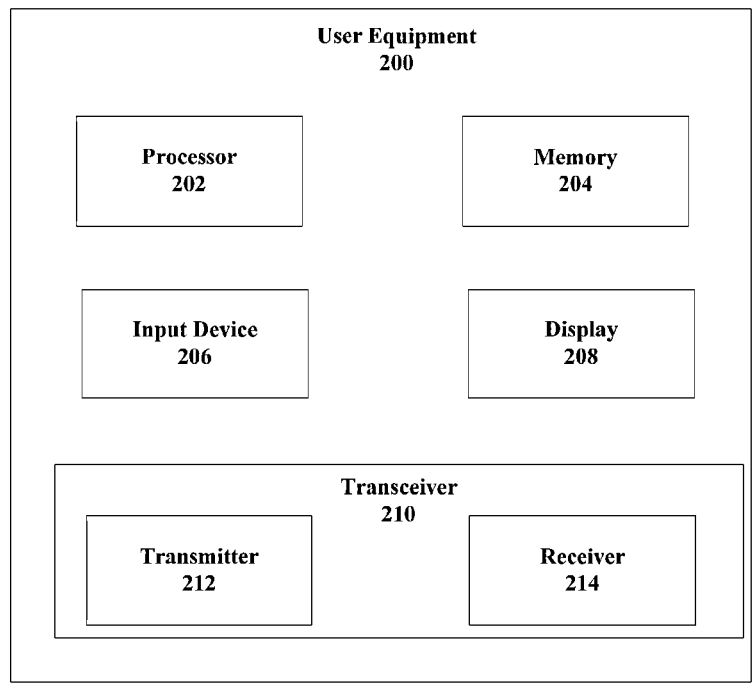
FIG. 2 is a schematic block diagram illustrating components of user equipment (UE) according to one embodiment.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or a similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and the display 208 may form a touchscreen or a similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
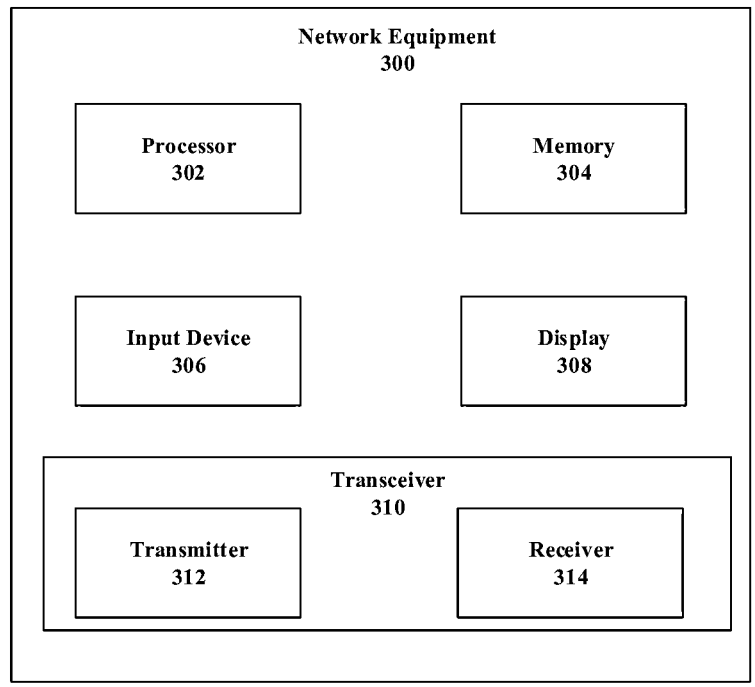
FIG. 3 is a schematic block diagram illustrating components of network equipment (NE) according to one embodiment.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. For example, the processor 302 may control the transceiver 310 to receive a PUCCH resource and/or a PUSCH resource. In another example, the processor 302 may control the transceiver 310 to transmit DL signals containing various configuration data to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

In NR Release 15, only downlink transmission from a single TRP is supported. NR Release 16 will support multiple TRPs. For multiple TRPs Multiple-Input Multiple-Output (MIMO) transmissions, each TRP has its CORESET(s). It has been agreed that the higher layers may configure an index for each CORESET that is used for generation of a separate HARQ feedback for multiple DCI-based, i.e. multiple PDCCH-based, multi-TRP DL transmissions. It means that the higher layers could configure different indices values for different CORESETs associated with different TRPs to indicate to the UE that it should generate separate HARQ codebooks corresponding to PDSCHs transmitted by different TRPs. A joint HARQ feedback or a joint HACK codebook may be configured for multiple PDCCH based multi-TRP operation with ideal backhaul as well.

Semi-static and dynamic HACK codebooks are supported in NR Release 15 for single TRP operation with HARQ information bits corresponding to received PDSCHs are transmitted either on the Physical Uplink Control Channel (PUCCH) or on the Physical Uplink Shared Channel (PUSCH). The UE does not expect to transmit more than one PUCCH with HARQ information bits in one slot in NR Release 15.

When UE detects a DCI, with DCI format 1_0 or a DCI format 1_1 scheduling, for a PDSCH reception ending in slot n, the UE will provide a corresponding HARQ information in a PUCCH transmission in slot n+k, where k is a number of slots and is indicated by the PDSCH-to-HARQ_feedback timing indicator field in the scheduling DCI, if present, or provided by a higher layer parameter dl-DataToUL-ACK. k=0 corresponds to the last slot of the PUCCH transmission that overlaps with the PDSCH reception.

The PUCCH resource for HARQ feedback determination is based on a PUCCH resource indicator (PRI) field in a last received DCI, i.e. DCI format 1_0 or DCI format 1_1, that has a value of the PDSCH-to-HARQ_feedback timing indicator field indicating the same slot for the PUCCH transmission. The UE detects the DCI formats transmitted from multiple TRPs and transmits HARQ information in a PUCCH selected by the PUCCH resource determination process.

The HARQ information bits for different TBs or CBGs carried on PDSCH received on one or more carriers can be transmitted in the same slot using one PUCCH resource according to the PDSCH-to-HARQ_feedback timing indicator field in the corresponding scheduling DCIs. NR Release 15 supports multiplexing of HARQ for multiple transport blocks received by a UE into one multi-bit HARQ message. The multiple bits of the multi-bit HARQ message can be multiplexed using either a semi-static codebook or a dynamic codebook, which is selected according to RRC configuration.

The semi-static codebook can be viewed as a matrix consisting of a time-domain dimension and a component-carrier (or CBG or TB) dimension, both of which are semi-statically configured. The size in the time domain is given by the maximum and minimum HARQ acknowledgment timings indicated by PDSCH-to-HARQ_feedback timing indicator field in the received DCI(s), e.g. DCI format 1_0 or DCI format 1_1, or configured by higher layers, e.g. dl-DataToUL-ACK. The size in the carrier domain is given by the number of simultaneous transport blocks (or CBGs) across all component carriers. The codebook size is fixed, and the number of bits to transmit in a HARQ report is known. Each entry in the matrix represents the decoding outcome, positive acknowledgment (A) or negative acknowledgment (N), of the corresponding transmission. For the slot without PDSCH transmission, a negative acknowledgment (N) is transmitted.

To address the drawback of a potentially large semi-static codebook size in some scenarios, NR Release 15 also supports a dynamic codebook. The dynamic codebook only includes the acknowledgment information for the scheduled carriers in the report, instead of all carriers. Hence, the size of such codebook is dynamically varied as a function of the number of scheduled carriers. This reduces the size of the acknowledgment message compared with the semi-static codebook.

The NR Release 15 uses the Downlink Assignment Index (DAI) included in the DCI and containing the downlink assignment for the UE to determine the HARQ codebook only when dynamic codebook is configured. The DAI field may have two parts, a counter DAI (cDAI) and, in the case of carrier aggregation, a total DAI (tDAI). The counter DAI indicates the number of scheduled downlink transmissions up to the point the DCI is received by the UE which is counted first in different carriers and then in different slots. The total DAI indicates the total number of downlink transmissions across all carriers up to this point in time, that is, the highest cDAI at the current time point.

According to some embodiments, both joint and separate HARQ feedbacks are supported for multiple PDCCH based multi-TRP DL transmissions, with an ideal backhaul, as well as, a non-ideal backhaul. The gNB may configure a higher layer signalling index per CORESET to be used to generate separate HARQ codebooks for different TRPs. In one aspect, methods for indicating a separate or a joint HARQ feedback, that should be performed by the UE, are disclosed.

In some embodiments, CORESETs are configured by higher layer signals to be associated with different TRPs. For example, in the higher layer signalling, the indices of the CORESETs corresponding to different TRPs may have different values. If a first index value is configured for some CORESETs, and a second index value is configured for some other CORESETs which is different from the first index value, the UE may generate separate HARQ codebooks and perform separate HARQ feedbacks. Otherwise, if the CORESETs are configured with a same index value, or are not configured with any index value, the UE may perform a joint HARQ feedback. The HARQ information for the TBs or CBGs carried on PDSCH(s) scheduled by the received DCI(s) at the UE are transmitted on the time frequency resource identified by all of the CORESETs corresponding to the same index value, or the same TRP, should be transmitted by one PUCCH.

Separate HARQ-ACK Feedback

Figure 4:
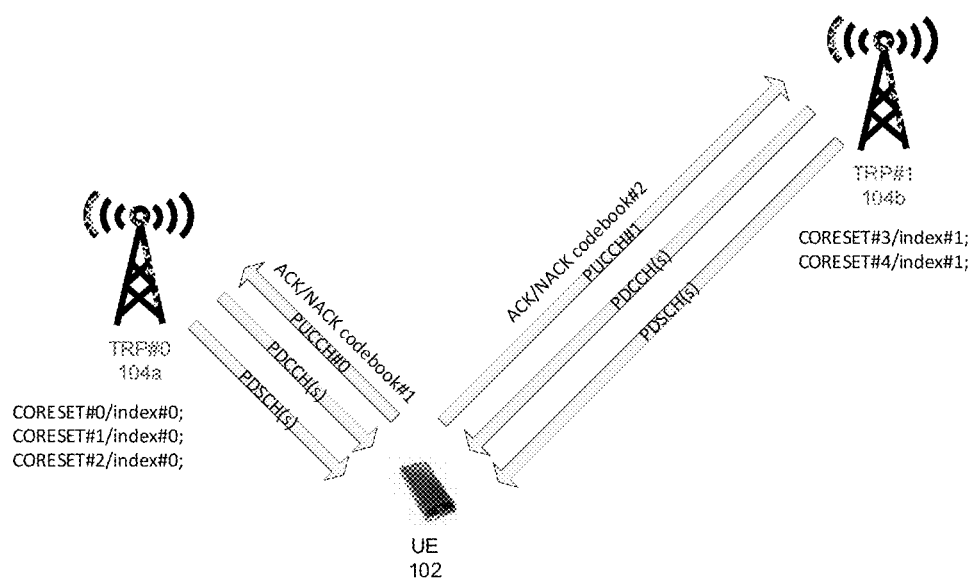
FIG. 4 is a schematic diagram illustrating multiple PDCCH based multiple TRP transmission.

As illustrated in FIG. 4, five CORESETs, namely CORESET #0, CORESET #1, CORESET #2, CORESET #3, and CORESET #4, are configured for a UE 102 in one Bandwidth Part (BWP). For example, the value of index #0 is configured for the CORESET #0, the CORESET #1 and the CORESET #2 for TRP #0 104*a*, while the value of index #1 is configured for the CORESET #3 and the CORESET #4 for TRP #1 104*b*. Separate HARQ codebooks are generated: one (codebook #1) for the TRP #0 and the other (codebook #2) for the TRP #1. It means that all HARQ information bits for PDSCHs scheduled by DCIs transmitted from CORESETs #0, #1 and #2 are contained in one HARQ codebook, namely the codebook #1, and all HARQ information bits for PDSCHs scheduled by DCIs transmitted from CORESETs #3 and #4 are contained in another HARQ codebook, namely the codebook #2, if the PDSCH-to-HARQ_feedback timing indicator fields in all received DCIs indicate the same slot for a PUCCH transmission. The two separate HARQ-ACK codebooks are transmitted by two PUCCH resources, e.g. PUCCH #0 and PUCCH #1, in a TDM manner to the respective TRPs.

If a UE reports the capability that the maximum number of transmitted PUCCH resources within a slot is "1", i.e. the maximum number of PUCCH resources capable of transmission within a slot is "1", however, different indices values are configured in the CORESETs associated with different TRPs (i.e. separate HARQ codebooks), the UE can only transmit one of the HARQ codebooks in one PUCCH resource in one slot. In such case, several methods are provided as follows with reference to the example illustrated in FIG. 4 in which two separate HARQ codebooks are generated.

Method 1

The UE does not expect to be configured with different indices values for all the CORESETs if it reports the capability that the maximum number of transmitted PUCCH resources within a slot equals to "1". Initially, the UE reports it capability that the maximum number of transmitted PUCCH resources within a slot equals to "1". The gNB then configure the same indices value in all the CORESETs. Accordingly, the UE will only transmit one PUCCH in one slot.

Method 2

The UE drops one HARQ codebook having fewer bits and only transmits the other HARQ codebook having more bits using the corresponding PUCCH resource indicated by the PUCCH resource indicator field in the last received DCI.

Method 3

The UE drops one HARQ codebook and only transmits the other HARQ codebook using the corresponding PUCCH resource indicated by the PUCCH resource indicator field in the last received DCI. It is up to UE implementation to determine which codebook to drop.

Method 4

A potential simultaneously transmission of PDSCH for Ultra Reliable Low Latency Communications (URLLC) and PDSCH for enhanced Mobile Broadband (eMBB) is considered. Since the URLLC PDSCH has a higher priority than the eMBB PDSCH, the HARQ codebook containing the HARQ information bits for the PDSCH transmitted on the RBs or symbols indicated by DCI format 2_1, which indicates a URLLC transmission, is transmitted. The other HARQ codebook is dropped if both codebooks are indicated to be reported in a same slot.

If a UE transmits a report indicating a maximum number of PUCCH resources capable of transmission within a slot is larger than "1", multiple HARQ codebooks corresponding to different TRPs can be transmitted by different PUCCH resources within a slot in a TDM manner.

For this case, the UE will expect the PUCCH resources indicated by the last received DCIs from the CORESETs associated with different TRPs are not overlapped in the time domain if the PDSCH-to-HARQ_feedback timing indicator fields in those DCIs indicate the same slot for PUCCH transmission.

Figure 5:
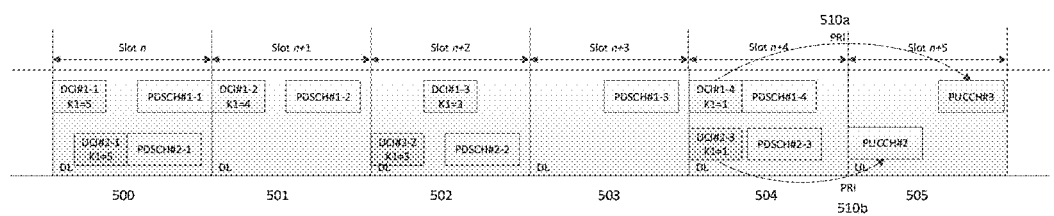
FIG. 5 is a schematic diagram illustrating a separate HARQ-ACK feedback for multiple TPRs with multiple PUCCH resources according to one embodiment.

FIG. 5 shows a scenario where a separate HARQ-ACK feedback is used. Taking the scenario illustrated in FIG. 5 as an example, DCI #1-1, PDSCH #1-1, DCI #2-1 and PDSCH #2-1 are transmitted in slot n 500. DCI #1-2 and PDSCH #1-2 are transmitted in slot n+1 501. DCI #1-3, DCI #2-2 and PDSCH #2-2 are transmitted in slot n+2 502. PDSCH #1-3 is transmitted in slot n+3 503. DCI #1-4, PDSCH #1-4, DCI #2-3, and PDSCH #2-3 are transmitted in slot n+4 504. Here, DCI #1-1, DCI #1-2, DCI #1-3, DCI #1-4, PDSCH #1-1, PDSCH #1-2, PDSCH #1-3, and PDSCH #1-4 are transmitted from one TRP; and DCI #2-1, DCI #2-2, DCI #2-3, PDSCH #2-1, PDSCH #2-2, PDSCH #2-3 are transmitted from another TRP. DCI #1-1, DCI #1-2, DCI #1-3 and DCI #1-4 are transmitted on the time frequency resource identified by the CORESETs configured with one index value for one TRP and the PDSCH-to-HARQ_feedback timing (K1) indicator field values, i.e. K1 value shown in FIG. 5, in those DCIs indicate that the HARQ feedback should be transmitted in in slot n+5 505. And the PUCCH for HARQ feedback indicated by the PUCCH resource indicator (PRI) field in the last DCI, i.e. DCI #1-4 is PUCCH #3. DCI #2-1, DCI #2-2 and DCI #2-3 are transmitted on the time frequency resource identified by the CORESETs configured with another index value for another TRP and the PDSCH-to-HARQ_feedback timing indicator field values, i.e. K1 value shown in FIG. 5, in those DCIs indicate that the HARQ feedback should also be transmitted in in slot n+5 505. And the PUCCH for HARQ feedback indicated by the PUCCH resource indicator (PRI) field in the last DCI, i.e. DCI #2-3 is PUCCH #2. The PUCCH resources indicated by the PUCCH resource indicator (PRI) fields 510*a*, 510*b* in the last received DCIs (DCI #1-4 and DCI #2-3) transmitted from different TRPs, i.e. PUCCH #3 and PUCCH #2 should not overlap in the time domain. Thus, the UE can transmit PUCCH #3 and PUCCH #2 to the respective TRPs in slot n+5 505 using different symbols because different symbols are not overlapped in the time domain.

Joint HARQ-ACK Feedback

If the CORESETs are configured with a same index value, or are not configured with any index value, the UE may perform joint HARQ feedback.

Figure 6:
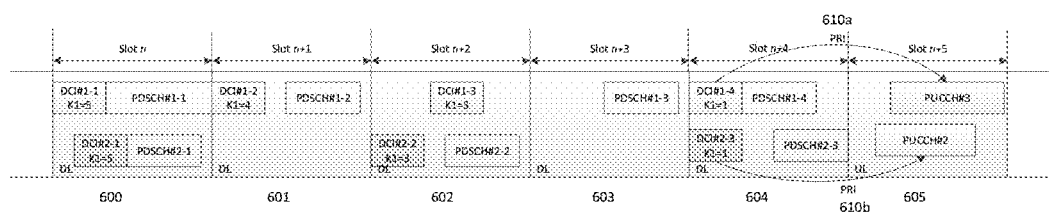
FIG. 6 is a schematic diagram illustrating a joint HARQ-ACK feedback with overlapped last DCIs according to one embodiment.

Selection of the Last DCI for PUCCH Resource Determination for the Joint HARQ-ACK Feedback FIG. 6 shows a case where a joint HARQ-ACK feedback is used. Using the case illustrated in FIG. 6 as an example, DCI #1-1, PDSCH #1-1, DCI #2-1 and PDSCH #2-1 are transmitted in slot n 600. DCI #1-2 and PDSCH #1-2 are transmitted in slot n+1 601. DCI #1-3, DCI #2-2 and PDSCH #2-2 are transmitted in slot n+2 602. PDSCH #1-3 is transmitted in slot n+3 603. DCI #1-4, PDSCH #1-4, DCI #2-3, and PDSCH #2-3 are transmitted in slot n+4 604. DCI #1-1, DCI #1-2, DCI #1-3, DCI #1-4, PDSCH #1-1, PDSCH #1-2, PDSCH #1-3, and PDSCH #1-4 are transmitted from one TRP; and DCI #2-1, DCI #2-2, DCI #2-3, PDSCH #2-1, PDSCH #2-2, PDSCH #2-3 are transmitted from another TRP. The HARQ information bits corresponding to the 7 PDSCHs transmitted by two TRPs will be fed back in the same slot 605 according to the PDSCH-to-HARQ_feedback timing indicator field, i.e. K1 values shown in FIG. 6, in the corresponding scheduling DCIs. The DCIs are transmitted on the time frequency resource identified by the CORESETs configured with a same index value for the two TRPs, and thus a joint HARQ codebook will be transmitted with a PUCCH resource determined by a last DCI received. However, the last DCIs, e.g. DCI #1-4 and DCI #2-3, transmitted by the two different TRPs are overlapped in the time domain. PUCCH #3 is indicated by the PRI field in DCI #1-4, and PUCCH #2 is indicated by DCI #2-3. A mechanism is needed to determine which one of the PUCCH resources, e.g. PUCCH #2 or PUCCH #3, should be selected to carry the HARQ codebook. In other words, for the case that the last DCIs transmitted by different TRPs overlap in a time domain and their PDSCH-to-HARQ_feedback timing indicator fields indicate a same slot for PUCCH transmission, one of these last DCIs is selected for the PUCCH resource determination for the joint HARQ feedback.

For example, the last received DCI that is transmitted on the time frequency resource identified by the CORESET having a larger or a lower CORESET-ID, CORESET group ID, Search space set ID or index value may be selected as the last DCI for joint HARQ-ACK feedback if the last DCIs transmitted by different TRPs are overlapped in the time domain for the case that the HARQ feedback corresponding to the PDSCHs scheduled by those DCIs is indicated to be fed back in a same slot.

In another example, the PDSCH processing delay may be considered. The PUCCH preparing time is dependent on the offset between the end of PDSCH reception and the start of PUCCH transmission. For example, the PUCCH resource which allows more PUCCH preparing time is selected as the PUCCH resource for joint HARQ codebook transmission.

Figure 7:
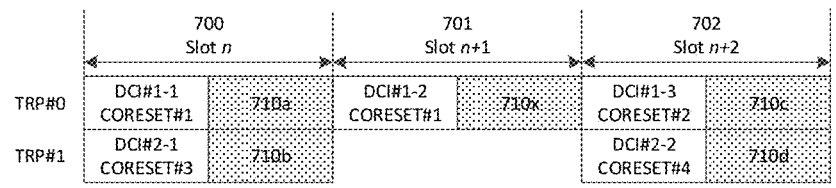
FIG. 7 is a schematic diagram illustrating multiple PDCCH based multi-TRP transmission with overlapped PDSCHs according to one embodiment.

Generation of Joint Semi-Static HARQ-ACK Codebook for PDSCHs Scheduled by Two DCIs Transmitted by Different TRPs As illustrated in FIG. 7, for a multi-DCI based multi-TRP system transmitting multiple PDSCHs 710 to one UE, the received PDSCHs 710 scheduled by different received DCIs transmitted by different TRPs, TRP #0 or TRP #1, may be overlapped in the time domain. In this example, DCI #1-1, PDSCH 710*a* scheduled by DCI #1-1, DCI #2-1 and PDSCH 710*b* scheduled by DCI #2-1 are transmitted in slot n 700. DCI #1-2 and PDSCH 710*x* scheduled by DCI #1-2 are transmitted in slot n+1 701. DCI #1-3, PDSCH 710*c* scheduled by DCI #1-1, DCI #2-2 and PDSCH 710*d* scheduled by DCI #2-2 are transmitted in slot n+2 702. Here, the PDSCH 710*c* and the PDSCH 710*d* may overlap in the time domain. DCI #1-1 and DCI #1-2 is transmitted form CORESET #1 configured for TRP #0, DCI #1-3 is transmitted form CORESET #2 configured for TRP #0, DCI #2-1 is transmitted form CORESET #3 configured for TRP #1 and DCI #2-2 is transmitted form CORESET #4 configured for TRP #1. A determined rule needs to be provided for the UE to generate HARQ information bits in one codebook corresponding to those received PDSCHs, such that the gNB can successfully decode the HARQ information bit for each PDSCH, i.e. the gNB knows the correspondence between the HARQ information bits in the codebook and those overlapped PDSCHs.

Option 1: Introducing a Downlink Assignment Indicator (DAI) field in the DCI for the case that joint semi-static codebook is configured for this UE by higher layers from the gNB.

The DAI field is used by the UE to count the received PDSCHs to generate the corresponding HARQ information bits for dynamic HARQ codebook feedback, and it can only be contained in the DCI for the dynamic HARQ codebook feedback in Release 15.

The gNB may also indicate a counter DAI field for semi-static HARQ codebook feedback if multiple PDCCH-based multi-TRP operation is configured for this UE by the gNB. A DAI value in the DCI denotes a cumulative number of {serving cell, PDCCH monitoring occasion}-pair(s) in which PDSCH receptions are associated with the DCI, up to the current serving cell and current PDCCH monitoring occasion, first in an ascending order of serving cell index and then in an ascending order of PDCCH monitoring occasion index. For the case that multiple DCIS transmitted by different TRPs are overlapped in the time domain, the PDCCH transmitted on the time frequency resource identified by the CORESET with the lower CORESET-ID has a smaller DAI value. The HARQ bits in the HARQ codebook may be ordered based on the values of DAI.

Figure 8:
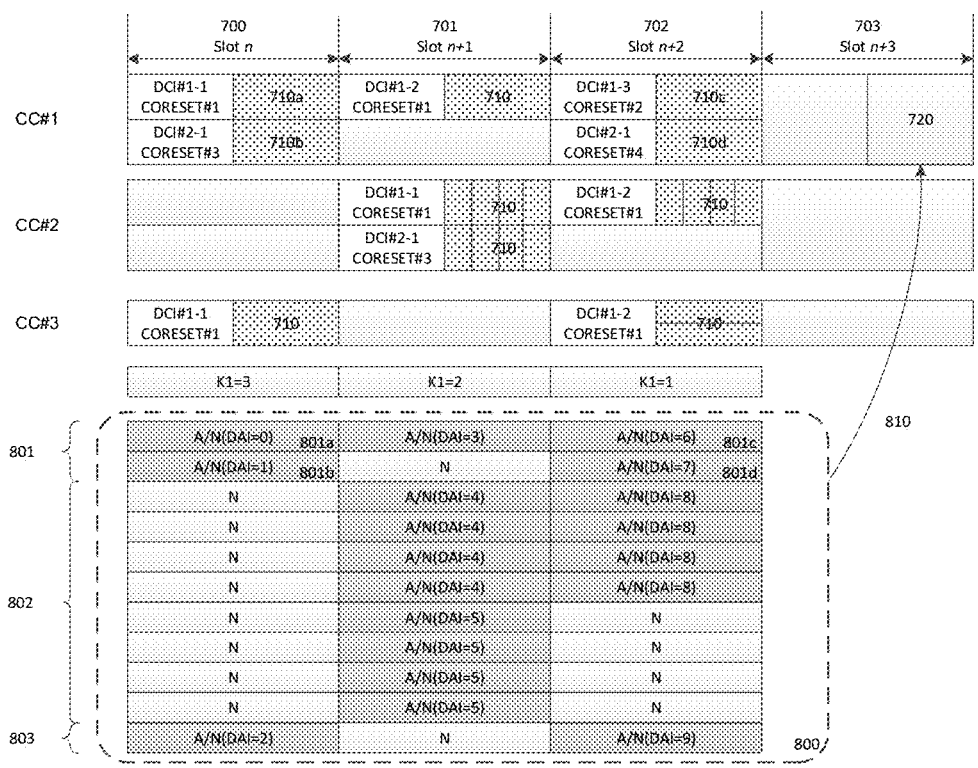
FIG. 8 is a schematic diagram illustrating a joint semi-static HARQ-ACK codebook with DAIs according to one embodiment.

An example is provided in FIG. 8 that shows a joint semi-static HARQ-ACK codebook with DAIS, where the HARQ information bits 800 corresponding to the ten PDSCHs 710 scheduled by DCIS transmitted by two TRPs (one configured with CORESET #1 and CORESET #2, the other configured with CORESET #3 and CORESET #4) in three component carriers (CC #1, CC #2, and CC #3) should be fed back in a same slot 703. Here, two component carriers (CC #1 and CC #2) are configured with two TRPs; one component carrier (CC #3) is configured with single TRP and a maximum number of two transport blocks (TB) in a slot; and one TB with 4 CBGs are configured for CC #2.

In component carrier CC #1, DCI #1-1, PDSCH 710*a* scheduled by DCI #1-1, DCI #2-1 and PDSCH 710*b* scheduled by DCI #2-1 are transmitted in slot n 700; DCI #1-2 and PDSCH 710 scheduled by DCI #1-2 are transmitted in slot n+1 701; DCI #1-3, PDSCH 710*c* scheduled by DCI #1-3, DCI #2-2 and PDSCH 710*d* scheduled by DCI #2-2 are transmitted in slot n+2 702. In component carrier CC #2, DCI #1-1, PDSCH 710 scheduled by DCI #1-1 (with four CBGs), DCI #2-1 and PDSCH 710 scheduled by DCI #2-1 are all transmitted in slot n+1 701; and DCI #1-2 and PDSCH 710 scheduled by DCI #1-2 are transmitted in slot n+2 702. In component carrier CC #3, DCI #1-1 and PDSCH 710 scheduled by DCI #1-1 are transmitted in slot n 700; DCI #1-2 and PDSCH 710 scheduled by DCI #1-2 (with two TBs) are transmitted in slot n+2 702. DCI #1-1 and DCI #1-2 is transmitted form CORESET #1, DCI #1-3 is transmitted form CORESET #2, DCI #2-1 is transmitted form CORESET #3, and DCI #2-2 is transmitted form CORESET #4.

The codebook 800 may be represented as a matrix, with each column corresponding to a slot 700 (K1=3), 701 (K1=2) and 702 (K1=1). In this example, the first two rows 801 correspond to PDSCHs of CC #1; the subsequent eight rows 802 correspond to PDSCHs of CC #2; and the last row 803 corresponds to PDSCHs of CC #3. The codebook 800 of a fixed size may be reported 810 using a PUCCH 720 in slot n+3 703. In the codebook 800, "A/N" represents an ACK or NACK depending on decoding outcome, and "N" represents a NACK that is set where no transmission is scheduled.

The DAI fields are configured in all the DCIs when the semi-static HARQ-ACK codebook is configured. The DAI values will increase in the order of carrier or CC index first when single DCI-based transmission is configured. When multiple DCI-based multiple TRP transmissions are configured for one UE on the same carrier, the DAI values on this carrier will increase in the order of CORESET-ID or CORESET group ID if multiple DCIs are received at the same time.

The PDSCHs 710*a*, 710*b* scheduled by DCI #1-1 and DCI #2-1 in CC #1 are overlapped in the time domain, however, the UE can determine the candidate PDSCH reception index according to the DAI field in the corresponding DCI, i.e. PDSCH 710*a* scheduled by DCI #1-1 corresponding to a lower candidate PDSCH index because of the smaller DAI value in DCI #1-1. Thus, the information bit 801*a* is associated with PDSCH 710*a*; and the information bit 801*b* is associated with PDSCH 710*b*. The same principle is also applied for the PDSCHs 710*c*, 710*d* scheduled by DCI #1-3 and DCI #2-1 in CC #1 (the information bit 801*c* being associated with PDSCH 710*c* and the information bit 801*d* is associated with PDSCH 710*d*), and the PDSCHs scheduled by DCI #1-1 and DCI #2-1 in CC #2. Accordingly, a HARQ-ACK codebook including HARQ-ACK information bits ordered as shown in FIG. 8 (based on the values of DAI) is transmitted in the PUCCH resource.

Option 2: HARQ TRP Bundling

HARQ TRP bundling can be introduced in Release 16 for multiple PDCCH based multi-TRP transmission, where the HARQ information bits for the PDSCH transmitted from different TRP in a same slot will be bundled in one or more bits.

A binary AND operation of the HARQ information bits corresponding to PDSCHs from different TRPs received in the same slot and on the same carrier will be performed to generate a HARQ codebook. If the UE receives only one PDSCH in a slot and on a carrier, the UE assumes ACK for the other potential PDSCH for the binary AND operation. ACK will only be fed back when the received multiple PDSCHs in the same slot on the same carrier are all correctly received if they are overlapped in the time domain.

Figure 9:
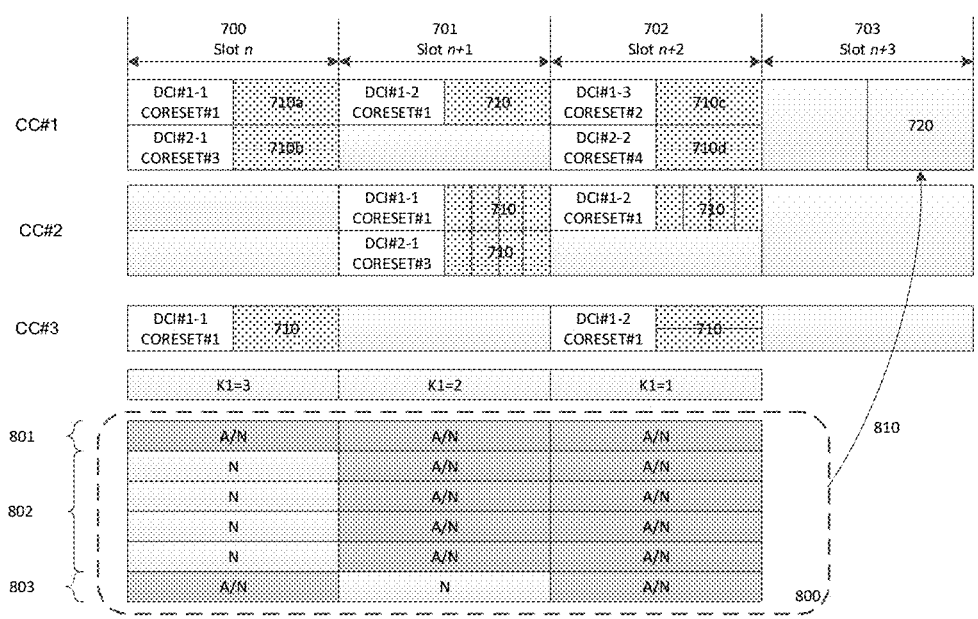
FIG. 9 is a schematic diagram illustrating a joint semi-static HARQ-ACK codebook with TRP bundling according to one embodiment.

FIG. 9 shows an example of a joint semi-static HARQ-ACK codebook with TRP bundling. The HARQ information bits 800 corresponding to the ten PDSCHs 710 scheduled by PDCCHs transmitted by two TRPs (one configured with CORESET #1 and CORESET #2, the other configured with CORESET #3 and CORESET #4) in three carriers (CC #1, CC #2, and CC #3) should be fed back in a same slot 703. The component carriers CC #1, CC #2 and CC #3 are similarly configured as those in FIG. 8.

In component carrier CC #1, DCI #1-1, PDSCH 710*a* scheduled by DCI #1-1, DCI #2-1 and PDSCH 710*b* scheduled by DCI #2-1 are transmitted in slot n 700; DCI #1-2 and PDSCH 710 scheduled by DCI #1-2 are transmitted in slot n+1 701; DCI #1-3, PDSCH 710*c* scheduled by DCI #1-3, DCI #2-2 and PDSCH 710*d* scheduled by DCI #2-2 are transmitted in slot n+2 702. In component carrier CC #2, DCI #1-1, PDSCH 710 scheduled by DCI #1-1 (with four CBGs), DCI #2-1 and PDSCH 710 scheduled by DCI #2-1 are all transmitted in slot n+1 701; DCI #1-2 and PDSCH 710 scheduled by DCI #1-2 are transmitted in slot n+2 702. In component carrier CC #3, DCI #1-1 and PDSCH 710 scheduled by DCI #1-1 are transmitted in slot n 700; DCI #1-2 and PDSCH 710 scheduled by DCI #1-2 (with two TBs) are transmitted in slot n+2 702. DCI #1-1 and DCI #1-2 is transmitted form CORESET #1, DCI #1-3 is transmitted form CORESET #2, DCI #2-1 is transmitted form CORESET #3, and DCI #2-2 is transmitted form CORESET #4.

The codebook 800 may be represented as a matrix, with each column corresponding to a slot 700 (K1=3), 701 (K1=2) and 702 (K1=1). In this example, the first row 801 corresponds to PDSCHs of CC #1; the subsequent four rows 802 correspond to PDSCHs of CC #2; and the last row 803 corresponds to PDSCHs of CC #3. The codebook 800 of a fixed size may be reported 810 using a PUCCH 720 in slot n+3 703. In the codebook, "A/N" represents an ACK or NACK depending on decoding outcome, and "N" represents a NACK that is set where no transmission scheduled.

Taking the example illustrated in FIG. 9, a single HARQ-ACK bit will be fed back for CC #1 and CC #3 per slot with multi-DCI based multi-TRP operation. In CC #2, one TB with 4 CBGs are configured, and one HARQ information bit is used for one CBG. As PDSCHs scheduled by DCI #1-1 and DCI #2-1 in CC #2 are overlapped in the time domain, 4 HARQ information bits will be fed back for these two PDSCHs and a binary AND operation will be performed for the HARQ information bits corresponding to the simultaneously received CBGs in slot n+1 701. ACK will be fed back for the PDSCH 710*a* and PDSCH 710*b* in CC #1 if both of them are correctly received.

Accordingly, a HARQ-ACK codebook including HARQ-ACK bits ordered as shown in FIG. 9 is transmitted in the PUCCH resource.

Option 3: HARQ-ACK Codebook Determined Based on the CORESET-ID Transmitting DCI

The HARQ-ACK codebook is generated according to the Release 15 procedure if the PDSCHs transmitted by two TRPs are not overlapped in the time domain. When the received multiple PDSCHs are overlapped in the time domain and the multiple DCIs are not overlapped in the time domain, the PDSCH corresponding to an earlier PDCCH monitoring occasion will have a lower index of occasion for candidate PDSCH reception. When both the PDSCHs and the scheduling DCIs are overlapped in the time domain, the PDSCH scheduled by the DCI transmitted from a CORESET with a lower CORESET-ID or CORESET group ID corresponds to a lower index of occasion for candidate PDSCH reception.

Figure 10:
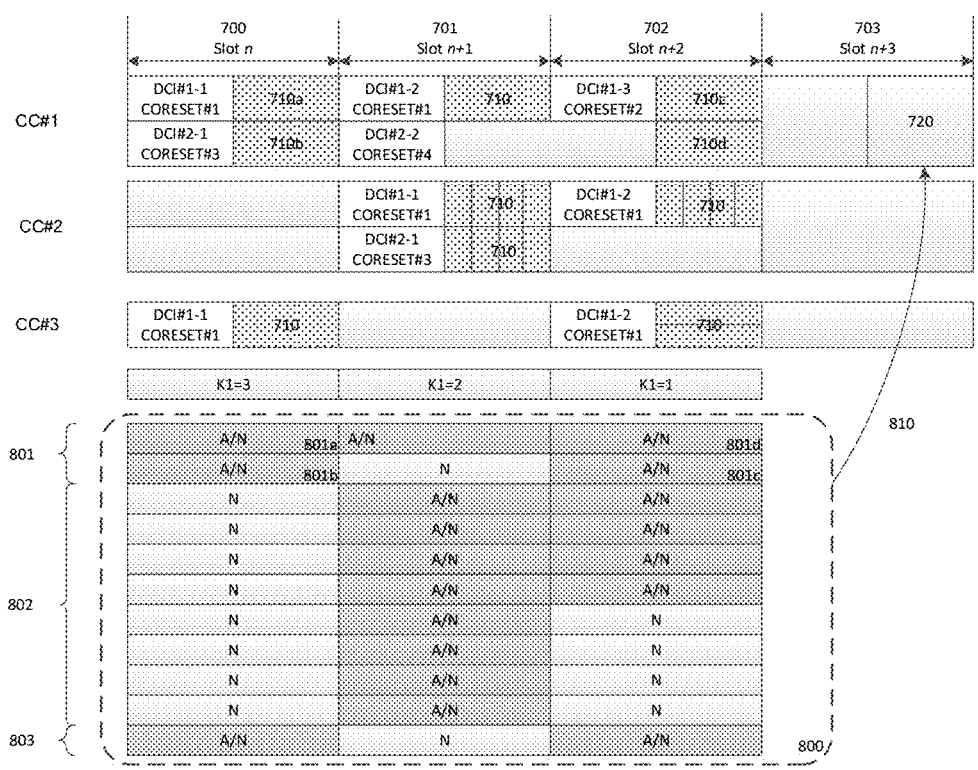
FIG. 10 is a schematic diagram illustrating a joint semi-static HARQ-ACK codebook according to one embodiment.

An example is illustrated in FIG. 10. The HARQ information bits 800 corresponding to the ten PDSCHs 710 scheduled by PDCCHs transmitted by two TRPs (one configured with CORESET #1 and CORESET #2, the other configured with CORESET #3 and CORESET #4) in three carriers (CC #1, CC #2, and CC #3) should be fed back in a same slot 703. The component carriers CC #1, CC #2 and CC #3 are similarly configured as those in FIG. 8 or FIG. 9. In component carrier CC #1, DCI #1-1, PDSCH 710*a* scheduled by DCI #1-1, DCI #2-1 and PDSCH 710*b* scheduled by DCI #2-1 are transmitted in slot n 700; DCI #1-2, DCI #2-2, and PDSCH 710 scheduled by DCI #1-2 are transmitted in slot n+1 701; DCI #1-3, PDSCH 710*c* scheduled by DCI #1-3, and PDSCH 710*d* scheduled by DCI #2-2 are transmitted in slot n+2 702. In component carrier CC #2, DCI #1-1, PDSCH 710 scheduled by DCI #1-1 (with four CBGs), DCI #2-1 and PDSCH 710 scheduled by DCI #2-1 are all transmitted in slot n+1 701; DCI #1-2 and PDSCH 710 scheduled by DCI #1-2 are transmitted in slot n+2 702. In component carrier CC #3, DCI #1-1 and PDSCH 710 scheduled by DCI #1-1 are transmitted in slot n 700; DCI #1-2 and PDSCH 710 scheduled by DCI #1-2 (with two TBs) are transmitted in slot n+2 702. DCI #1-1 and DCI #1-2 is transmitted form CORESET #1, DCI #1-3 is transmitted form CORESET #2, DCI #2-1 is transmitted form CORESET #3, and DCI #2-2 is transmitted form CORESET #4.

The codebook 800 may be represented as a matrix, with each column corresponding to a slot 700 (K1=3), 701 (K1=2) and 702 (K1=1). In this example, the first two rows 801 correspond to PDSCHs of CC #1; the subsequent eight rows 802 correspond to PDSCHs of CC #2; and the last row 803 corresponds to PDSCHs of CC #3. The codebook 800 of a fixed size may be reported 810 using a PUCCH 720 in slot n+3 703. DCI #1-1 and DCI #2-1 in CC #1 are overlapped in the time domain and the scheduled PDSCHs 710*a*, 710*b* are overlapped in the time domain as well, and the PDSCH 710*a* scheduled by DCI #1-1 will have a lower index of occasion for candidate PDSCH reception because of a lower CORESET-ID (CORESET #1). Thus, the HARQ bits for the PDSCHs scheduled by DCI #1-1 and DCI #2-1 are ordered, with information bit 801*a* corresponding to PDSCH 710*a* scheduled by DCI #1-1 first and information bit 801*b* corresponding to PDSCH 710*b* scheduled by DCI #2-1 second, as shown in FIG. 10. The PDSCHs 710*c*, 710*d* scheduled by DCI #1-3 and DCI #2-2 in CC #1 are simultaneously received by the UE (i.e. overlapped in the time domain), and the PDSCH 710*d* scheduled by DCI #2-2 will have a lower index of occasion for candidate PDSCH reception because it corresponds to an earlier PDCCH monitoring occasion. Thus, the HARQ-ACK bits for the PDSCHs scheduled by DCI #1-3 and DCI #2-2 are ordered, with information bit 801*d* corresponding to PDSCH 710*d* scheduled by DCI #2-2 first and information bit 801*c* corresponding to PDSCH 710*c* scheduled by DCI #1-3 second, as shown in FIG. 10. In the codebook, "A/N" represents an ACK or NACK depending on decoding outcome, and "N" represents a NACK that is set where no transmission scheduled.

Accordingly, a HARQ-ACK codebook including HARQ-ACK bits ordered as shown in FIG. 10 is transmitted in the PUCCH resource, in which the HARQ-ACK information bits are ordered based on candidate PDSCH reception occasion indices of the PDSCHs simultaneously received.

While only two TRPs are assumed in some of the examples above. A person of ordinary skill in the art would be able to understand that the principles illustrated may apply to systems with three TRPs or more. In the case of three or more TRPs, separate HARQ-ACK feedback may comprise a plurality of HARQ-ACK codebooks, one for each TRP. The HARQ-ACK codebooks may be transmitted through a plurality of uplink resources, one for each TRP. The joint HARQ-ACK feedback may comprise one single HARQ-ACK codebook, that contains information bits for the PDSCHs received from all the TRPs. Alternatively, the joint HARQ-ACK feedback may also comprise more than one HARQ-ACK codebooks, and at least one of the HARQ-ACK codebooks contains information bits for the PDSCHs received from a subset of the TRPs. The subset may also comprise a plurality of TRPs. In this case, the HARQ-ACK codebook, which contains information bits for the PDSCHs received from multiple TRPs, may also be referred to as a joint HARQ-ACK codebook, or a joint HARQ-ACK feedback. The joint HARQ-ACK feedback may be transmitted through one uplink resource.

In some embodiments, the separate HARQ-ACK feedback may comprise a plurality of HARQ-ACK codebooks. Each HARQ-ACK codebook may be transmitted to a separate TRP, through a separate uplink resource. The joint HARQ-ACK feedback may comprise one or more HARQ-ACK codebooks. At least one of the HARQ-ACK codebooks may be associated with a plurality of TRPs, and thus may be transmitted to one of the TRPs, through one uplink resource. In some embodiments, the uplink resources may be Physical Uplink Control Channel (PUCCH) resources. In some other embodiment, the uplink resources may be Physical Uplink Shared Channel (PUSCH) resources.

Figure 11:
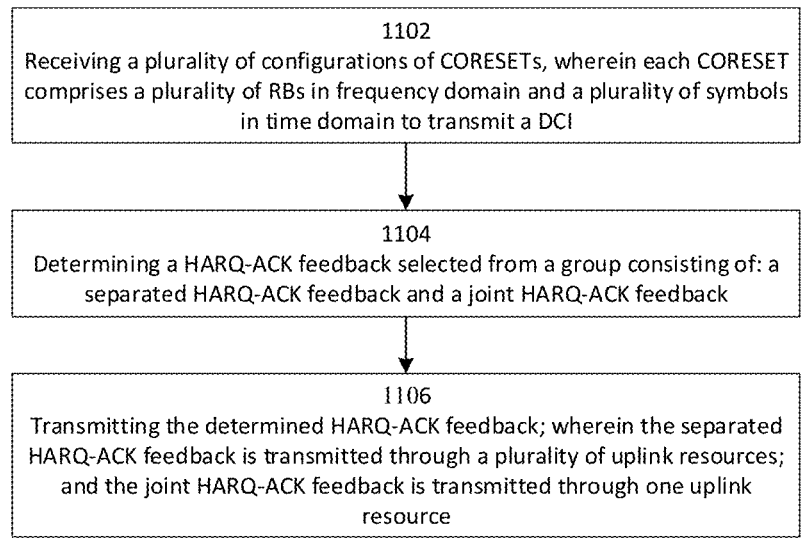
FIG. 11 is a flow chart illustrating steps of HARQ-ACK feedback for multiple PDCCH based multi-TRP transmission according to one embodiment.

FIG. 11 is a flow chart illustrating steps of HARQ feedback for multiple PDCCH-based multi-TRP transmission at the UE side.

At step 1102, the receiver 214 at the UE side receives a plurality of configurations of control resource sets (CORESETs), wherein each CORESET comprises a plurality of resource blocks (RBs) in frequency domain and a plurality of symbols in time domain, and time-frequency resources identified by the CORESET are used to transmit DCIs.

At step 1104, the processor 202 at the UE side determines a Hybrid Automatic Repeat Request (HARQ) Acknowledgement (ACK) feedback selected from a group consisting of: a separate HARQ-ACK feedback and a joint HARQ-ACK feedback.

The separate HARQ-ACK feedback is transmitted through a plurality of uplink resources; and the joint HARQ-ACK feedback is transmitted through one uplink resource.

At step 1106, the transmitter 212 at the UE side transmits the determined HARQ-ACK feedback.

Figure 12:
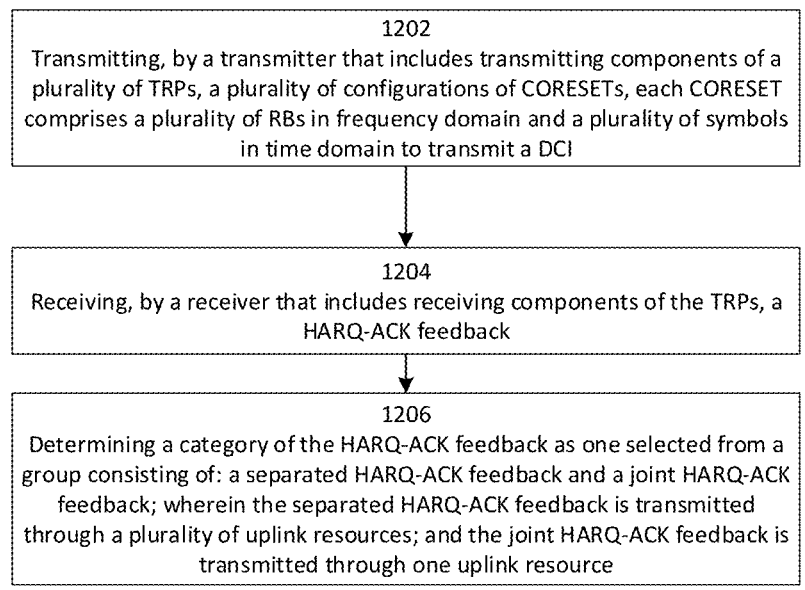
FIG. 12 is a flow chart illustrating steps of HARQ-ACK feedback for multiple PDCCH based multi-TRP transmission according to one embodiment.

FIG. 12 is a flow chart illustrating steps of HARQ-ACK feedback for multiple PDCCH based multi-TRP DL transmission at the NE side.

At step 1202, the transmitter 312 at the NE side that includes transmitting components of a plurality of transmit and receive points (TRPs) transmits a plurality of configurations of control resource sets (CORESETs), each CORESET comprises a plurality of resource blocks (RBs) in frequency domain and a plurality of symbols in time domain, and time-frequency resources identified by the CORESET are used to transmit DCIs.

At step 1204, the receiver 314 at the NE side that includes receiving components of the TRPs receives a Hybrid Automatic Repeat Request (HARQ) Acknowledgement (ACK) feedback.

At step 1206, the processor 302 at the NE side determines a category of the HARQ-ACK feedback as one selected from a group consisting of: a separate HARQ-ACK feedback and a joint HARQ-ACK feedback, wherein the separate HARQ-ACK feedback is transmitted through a plurality of uplink resources; and the joint HARQ-ACK feedback is transmitted through one uplink resource.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. An apparatus A user equipment (UE) for wireless communication, comprising:
at least one memory; and
at least one processor coupled with the at least one memory and configured to cause the UE to:
transmit a report that indicates a maximum number of uplink resources associated with a transmission as one uplink resource within a slot in a time domain;
receive a plurality of configurations corresponding to control resource sets, each control resource set comprising a plurality of resource blocks in a frequency domain and a plurality of symbols in the time domain;
select, based at least in part on the control resource sets being associated with different index values, a separate hybrid automatic repeat request acknowledgement feedback from a group comprising the separate hybrid automatic repeat request acknowledgement feedback and a joint hybrid automatic repeat request acknowledgement feedback; and
transmit, based at least in part on the maximum number of uplink resources being the one uplink resource within the slot in the time domain, the transmission using a hybrid automatic repeat request acknowledgement codebook associated with a control resource set of the control resource sets, the transmission comprising the separate hybrid automatic repeat request acknowledgement feedback.

2. The UE of claim 1, wherein the one uplink resource is a physical uplink control channel resource, and wherein the at least one processor is further configured to cause the UE to determine whether the control resource sets comprise an index value.

3. The UE of claim 2, wherein the at least one processor is further configured to cause the UE to select the joint hybrid automatic repeat request acknowledgement feedback upon determining that the control resource sets comprise a same index value.

4. The UE of claim 3, wherein the at least one processor is further configured to cause the UE to:
transmit the joint hybrid automatic repeat request acknowledgement feedback using the physical uplink control channel resource, the physical uplink control channel resource based at least in part on a last received downlink control information;
determine that a plurality of downlink control information transmitted from different control resource sets overlap in the time domain; and
determine the last received downlink control information based at least in part on at least one of a control resource set identifier, a control resource set group identifier, a search space set identifier, or the index value.

5. The UE of claim 2, wherein the at least one processor is further configured to cause the UE to select the joint hybrid automatic repeat request acknowledgement feedback upon determining that the control resource sets do not comprise the index value.

6. The UE of claim 2, wherein a first hybrid automatic repeat request acknowledgement codebook is associated with a first index value and a second hybrid automatic repeat request acknowledgement codebook is associated with a second index value.

7. The UE of claim 6, wherein the at least one processor is further configured to cause the UE to select the hybrid automatic repeat request acknowledgement codebook from the first hybrid automatic repeat request acknowledgement codebook or the second hybrid automatic repeat request acknowledgement codebook, while the other of the first hybrid automatic repeat request acknowledgement codebook or the second hybrid automatic repeat request acknowledgement codebook is dropped.

8. The UE of claim 7, wherein the at least one processor is further configured to cause the UE to select the hybrid automatic repeat request acknowledgement codebook from the first hybrid automatic repeat request acknowledgement codebook or the second hybrid automatic repeat request acknowledgement codebook based at least in part on the hybrid automatic repeat request acknowledgement codebook comprising one or more hybrid automatic repeat request acknowledgement information bits for one or more physical downlink shared channels that are transmitted on one or more resource blocks indicated by downlink control information format 2_1.

9. The UE of claim 6, wherein the at least one processor is further configured to cause the UE to:
transmit the first hybrid automatic repeat request acknowledgement codebook with a first physical uplink control channel resource; and
transmit the second hybrid automatic repeat request acknowledgement codebook with a second physical uplink control channel resource, wherein the first physical uplink control channel resource and the second physical uplink control channel resource do not overlap in the time domain.

10. A base station for wireless communication, comprising:
at least one memory; and
at least one processor coupled with the at least one memory and configured to cause the base station to:
receive a report that indicates a maximum number of uplink resources associated with a transmission as one uplink resource within a slot in a time domain;
transmit a plurality of configurations corresponding to control resource sets, each control resource set comprising a plurality of resource blocks in a frequency domain and a plurality of symbols in the time domain;
receive, based at least in part on the maximum number of uplink resources being the one uplink resource within the slot in the time domain, a transmission using a hybrid automatic repeat request acknowledgement codebook associated with a control resource set of the control resource sets, the transmission comprising a separate hybrid automatic repeat request acknowledgement feedback, the separate hybrid automatic repeat request acknowledgement feedback selected from a group comprising the separate hybrid automatic repeat request acknowledgement feedback and a joint hybrid automatic repeat request acknowledgement feedback based at least in part on the control resource sets being associated with different index values.

11. The base station of claim 10, wherein the control resource sets are associated with a same index value based at least in part on the maximum number of uplink resources being the one uplink resource within the slot in the time domain.

12. The base station of claim 10, wherein the at least one processor is further configured to:
transmit a semi-static hybrid automatic repeat request acknowledgement codebook configuration; and
transmit a downlink control information comprising a downlink assignment index field that schedules a physical downlink shared channel resource.

13. The base station of claim 12, wherein a downlink assignment index value for the downlink assignment index field denotes an accumulative number of serving cell, physical downlink control channel monitoring occasion-pair in a preset order.

14. A method performed by a user equipment (UE), the method comprising:
transmitting a report that indicates a maximum number of uplink resources associated with a transmission as one uplink resource within a slot in a time domain;
receiving a plurality of configurations corresponding to control resource sets, each control resource set comprising a plurality of resource blocks in a frequency domain and a plurality of symbols in the time domain;
selecting, based at least in part on the control resource sets being associated with different index values, a separate hybrid automatic repeat request acknowledgement feedback from a group comprising the separate hybrid automatic repeat request acknowledgement feedback and a joint hybrid automatic repeat request acknowledgement feedback; and
transmitting, based at least in part on the maximum number of uplink resources being the one uplink resource within the slot in the time domain, the transmission using a hybrid automatic repeat request acknowledgement codebook associated with a control resource set of the control resource sets, the transmission comprising the separate hybrid automatic repeat request acknowledgement feedback.

15. The method of claim 14, wherein the one uplink resource is a physical uplink control channel resource, and wherein the method further comprises determining whether the control resource sets comprise an index value.

16. The method of claim 15, further comprising selecting the joint hybrid automatic repeat request acknowledgement feedback upon determining that the control resource sets comprise a same index value.

17. The method of claim 16, further comprising:
transmitting the joint hybrid automatic repeat request acknowledgement feedback using the physical uplink control channel resource, the physical uplink control channel resource based at least in part on a last received downlink control information;
determining that a plurality of downlink control information transmitted from different control resource sets overlap in the time domain; and
determining the last received downlink control information based at least in part on at least one of a control resource set identifier, a control resource set group identifier, a search space set identifier, or the index value.

18. The method of claim 15, further comprising selecting the joint hybrid automatic repeat request acknowledgement feedback upon determining that the control resource sets do not comprise the index value.

19. The method of claim 15, wherein a first hybrid automatic repeat request acknowledgement codebook is associated with a first index value and a second hybrid automatic repeat request acknowledgement codebook is associated with a second index value.

20. The method of claim 19, further comprising selecting the hybrid automatic repeat request acknowledgement codebook from the first hybrid automatic repeat request acknowledgement codebook or the second hybrid automatic repeat request acknowledgement codebook, while the other of the first hybrid automatic repeat request acknowledgement codebook or the second hybrid automatic repeat request acknowledgement codebook is dropped.

* * * * *